J. E. LYNCH AND J. W. WOODWARD.
LOCK FOR STEERING POSTS.
APPLICATION FILED APR. 28, 1920.
1,392,186. Patented Sept. 27, 1921.
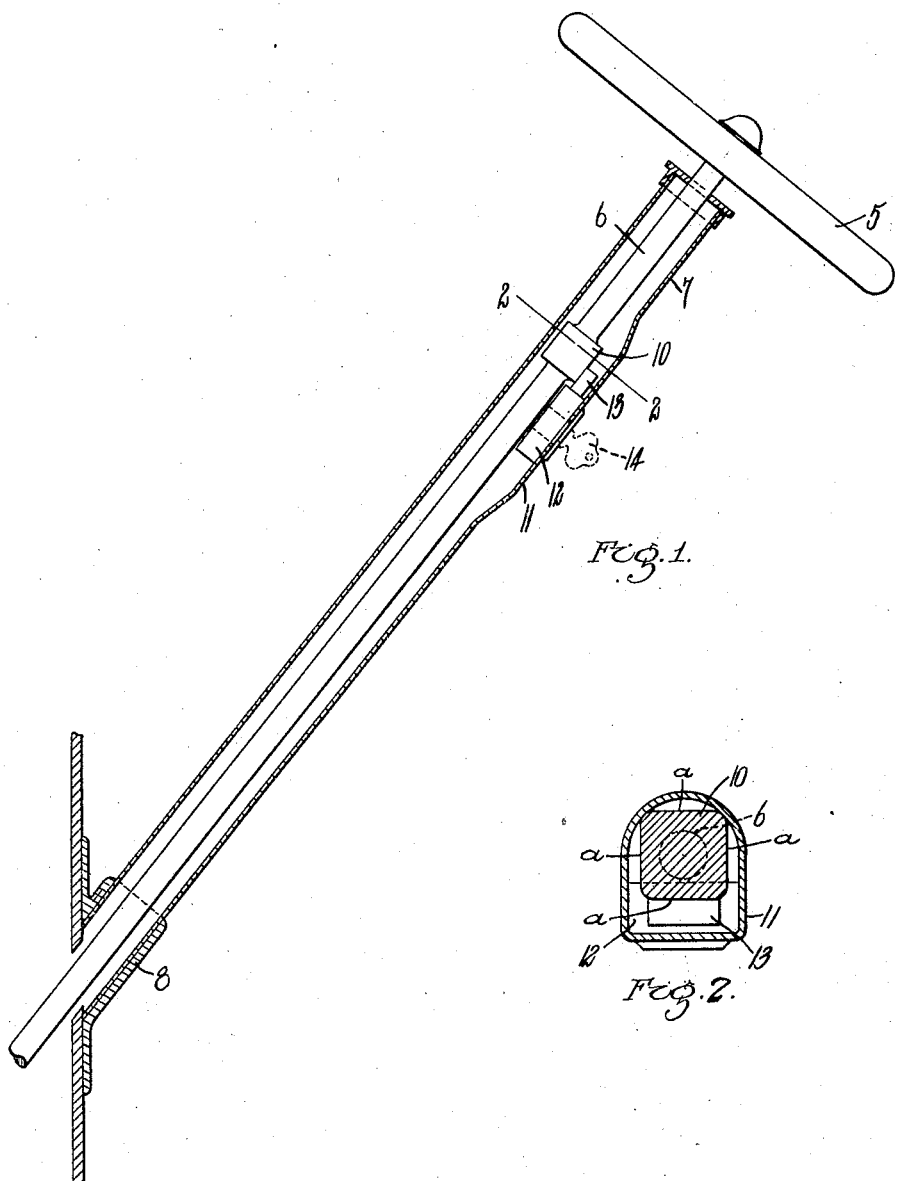

UNITED STATES PATENT OFFICE.

JEROME E. LYNCH, OF NEWTON CENTER, AND JAMES W. WOODWARD, OF BROOKLINE, MASSACHUSETTS.

LOCK FOR STEERING-POSTS.

1,392,186. Specification of Letters Patent. Patented Sept. 27, 1921.

Application filed April 28, 1920. Serial No. 377,246.

*To all whom it may concern:*

Be it known that we, JEROME E. LYNCH, a citizen of the United States, residing at Newton Center, in the county of Middlesex and State of Massachusetts, and JAMES W. WOODWARD, a citizen of the United States, residing at Brookline, in the county of Norfolk and State of Massachusetts, have invented new and useful Improvements in Locks for Steering-Posts, of which the following is a specification.

This invention relates to a lock for a steering post.

The object of the invention is to provide a cheap simple device for preventing the steering wheel of a vehicle from being turned by unauthorized persons, and by so doing, make it impossible to steer said vehicle, with the further object in view of preventing the theft of said vehicle.

The invention consists in the combination and arrangement of parts set forth in the following specification and particularly pointed out in the claims thereof.

Referring to the drawnigs:

Figure 1 is a vertical sectional elevation of a portion of a steering mechanism embodying our invention.

Fig. 2 is a transverse section taken on the line 2—2 of Fig. 1.

Like numerals refer to like parts throughout the several views of the drawings.

In the drawings 5 represents a steering wheel of a vehicle preferably an automobile, the said steering wheel being securely fastened to a steering post 6 in order that said post may be rotated thereby. The steering post 6 is surrounded by a cylindrical casing 7 which is securely fastened to a flanged fitting 8 which in turn is supported upon a dash board of the automobile, thereby making it impossible to rotate the casing 7. At any suitable location upon the steering post 6 a squared portion 10 is formed having a plurality of flat surfaces $a$. The casing 7 adjacent to the squared portion 10 of the steering post 6 is enlarged at 11, and securely fastened thereto is a suitable lock 12 of any desirable construction and well known to those skilled in the art. The lock 12 is provided with a sliding bolt 13, the movement of which is controlled by a suitable key 14 illustrated in dotted lines Fig. 1, which may be inserted in the usual manner to move the bolt 13 in front of one of the flat surfaces $a$ of the squared portion 10 as illustrated in Fig. 1, or to withdraw said bolt from said position and return the same to a position within the lock. The flat surfaces $a$ are preferably so positioned that in order to move the bolt 13 into engagement therewith to prevent the rotation of the steering post 6, it is necessary to turn the steering wheel 5 slightly to position the front wheels at an angle to the rear wheels of the vehicle, thereby making it impossible to drive the vehicle in a straight course when the steering wheel is locked.

The general operation of the device is as follows: When bringing the vehicle to a stop, the steering wheel 5 is turned slightly to position one of the flat surfaces $a$ of the squared portion 10 with the front wheels at an angle. The key 14 is then inserted in the lock 12 and turned in the proper direction to move the bolt 13 in front of the surface $a$, after which the key is removed, thereby making it impossible to turn the steering post 6 by the steering wheel 5 attached thereto. If an attempt is made to operate the vehicle with the steering wheel thus locked, it will be impossible to properly direct the course of said vehicle, which will have a tendency to travel in a circle, thereby rendering an attempt at the theft thereof impractical.

Having thus described our invention, what we claim and desire by Letters Patent to secure is:

1. In combination, a steering post provided with a squared portion formed integral therewith, a steering wheel attached to said steering post, a casing surrounding said steering post and a lock attached to said casing and provided with a bolt adapted to be moved by a key into the path of said squared portion and thereby to prevent the rotation of said steering post.

2. In combination, a steering post provided with an enlarged portion formed integral therewith, a steering wheel attached to said steering post, a casing surrounding said steering post and a lock attached to said casing upon the interior thereof and provided with a bolt adapted to be moved by a key into locking engagement with said enlarged portion and thereby to prevent the rotation of said steering post.

3. In combination, a steering post provided with a plurality of flat surfaces formed thereon, a steering wheel attached to said steering post, a casing surrounding said steering post, a lock attached to said casing upon the interior thereof and provided with a bolt, and a key adapted to move said bolt into the path of said flat surface and thereby prevent the rotation of said steering post, said bolt also being adapted to be moved by said key out of the path of said flat surfaces, whereby said steering post may again be rotated.

In testimony whereof we have hereunto set our hands in presence of two subscribing witnesses.

JEROME E. LYNCH.
JAMES W. WOODWARD.

Witnesses:
FRANKLIN E. LOW,
HERMAN R. HOFFMAN.